US010904452B2

(12) United States Patent
Choi et al.

(10) Patent No.: US 10,904,452 B2
(45) Date of Patent: Jan. 26, 2021

(54) METHOD OF GENERATING COMPOSITE IMAGE USING PLURALITY OF IMAGES WITH DIFFERENT EXPOSURE VALUES AND ELECTRONIC DEVICE SUPPORTING THE SAME

(71) Applicant: Samsung Electronics Co., Ltd., Suwon-si (KR)

(72) Inventors: Byungpo Choi, Suwon-si (KR); Insu Yu, Suwon-si (KR); Jongpil Park, Suwon-si (KR); Jinho Lim, Suwon-si (KR); Jiyoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 16/229,675

(22) Filed: Dec. 21, 2018

(65) Prior Publication Data

US 2019/0199905 A1 Jun. 27, 2019

(30) Foreign Application Priority Data

Dec. 21, 2017 (KR) .......................... 10-2017-0176763

(51) Int. Cl.
H04N 5/235 (2006.01)

(52) U.S. Cl.
CPC ......... *H04N 5/2355* (2013.01); *H04N 5/2351* (2013.01); *H04N 5/2353* (2013.01)

(58) Field of Classification Search
CPC .. H04N 5/2355; H04N 5/2356; H04N 5/2351; H04N 5/2353
See application file for complete search history.

(56) References Cited

U.S. PATENT DOCUMENTS

| 6,879,731 B2 | 4/2005 | Kang et al. |
| 7,010,174 B2 | 3/2006 | Kang et al. |
| 7,239,757 B2 | 7/2007 | Kang et al. |
| 7,382,931 B2 | 6/2008 | Kang et al. |
| 7,945,155 B2 | 5/2011 | Jang et al. |

(Continued)

FOREIGN PATENT DOCUMENTS

| JP | 2013-157904 A | 8/2013 |
| JP | 2014-052487 A | 3/2014 |

(Continued)

OTHER PUBLICATIONS

International Search Report dated Apr. 1, 2019, issued in International Patent Application No. PCT/KR2018/016521.

*Primary Examiner* — Sinh Tran
*Assistant Examiner* — Zhenzhen Wu
(74) *Attorney, Agent, or Firm* — Jefferson IP Law, LLP

(57) ABSTRACT

An electronic device is provided. The electronic device includes a memory, a camera module, and a processor electrically connected to the memory and the camera module. The processor is configured to determine a first exposure value based on a brightness of an external object, sequentially capture a plurality of images using a first exposure value, a second exposure value having an exposure value less than the first exposure value, the first exposure value, and a third exposure value having an exposure value greater than the first exposure value, when a specified condition is satisfied, select a set of continuous images from the plurality of images, and generate a composite image using the set of continuous images.

19 Claims, 8 Drawing Sheets

(56) References Cited

U.S. PATENT DOCUMENTS

| | | | |
|---|---|---|---|
| 9,596,400 B2 | 3/2017 | Matsuyama | |
| 2004/0218830 A1 | 11/2004 | Kang et al. | |
| 2005/0047676 A1 | 3/2005 | Kang et al. | |
| 2005/0243177 A1 | 11/2005 | Kang et al. | |
| 2006/0133688 A1 | 6/2006 | Kang et al. | |
| 2009/0226160 A1 | 9/2009 | Jang et al. | |
| 2010/0182453 A1* | 7/2010 | Nagai | H04N 5/235 348/231.2 |
| 2013/0076973 A1* | 3/2013 | Kobayashi | H04N 5/2356 348/362 |
| 2013/0121618 A1* | 5/2013 | Yadav | G06T 5/008 382/294 |
| 2013/0329092 A1 | 12/2013 | Wong | |
| 2014/0063330 A1 | 3/2014 | Matsuyama | |
| 2015/0015774 A1* | 1/2015 | Sugie | H04N 5/2353 348/364 |
| 2015/0358552 A1* | 12/2015 | Kobayashi | H04N 5/35581 348/239 |
| 2018/0041724 A1 | 2/2018 | Kim et al. | |
| 2020/0029060 A1* | 1/2020 | Yokokawa | H04N 5/2355 |
| 2020/0244865 A1* | 7/2020 | Chen | H04N 5/23229 |

FOREIGN PATENT DOCUMENTS

| | | |
|---|---|---|
| JP | 2015-109684 A | 6/2015 |
| JP | 2015-154447 A | 8/2015 |
| JP | 2016-19196 A | 2/2016 |
| JP | 2016-96392 A | 5/2016 |
| KR | 10-2006-0012278 A | 2/2006 |
| KR | 10-1417816 B1 | 7/2014 |
| KR | 10-2016-0108928 A | 9/2016 |

\* cited by examiner

METHOD OF GENERATING COMPOSITE IMAGE USING PLURALITY OF IMAGES WITH DIFFERENT EXPOSURE VALUES AND ELECTRONIC DEVICE SUPPORTING THE SAME

CROSS-REFERENCE TO RELATED APPLICATION(S)

This application is based on and claims priority under 35 U.S.C. § 119(a) of a Korean patent application number 10-2017-0176763, filed on Dec. 21, 2017, in the Korean Intellectual Property Office, the disclosure of which is incorporated by reference herein its entirety.

BACKGROUND

1. Field

The disclosure relates to a technology for processing an image.

2. Description of the Related Art

An electronic device including a camera module such as a digital camera, a digital camcorder, or a smart phone is being released. The electronic device including the camera module may provide various functions associated with capturing images. For example, the electronic device may output a preview image obtained from the camera module, to a display and may obtain an image by a shutter input. Furthermore, the electronic device may provide a function such as auto focus adjustment, auto exposure settings, zoom in, zoom out, continuous shooting, timer shooting, flash on/off, filtering, or the like.

The electronic device including the camera module may provide a high dynamic range (HDR) function. The HDR function may be a technology for reducing the difference between the subject that the user actually sees and the image obtained by capturing the subject. In the HDR function, the expression range of the image data captured by the camera module, for example, the range of a gray scale may be wider than that in the standard dynamic range (SDR). The HDR image may be expressed to be brighter in the bright area and to be darker in the dark area than the SDR image.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an image processing method for obtaining a high dynamic range (HDR) image without a separate device for the HDR image by effectively changing an exposure value of a camera module, and an electronic device supporting the same.

Conventionally, for the purpose of obtaining an HDR image, a separate device required for the HDR image has been inevitably required. Since at least three or more images obtained at different exposure values (e.g., low-exposure, mid-exposure, and high-exposure) are required to obtain one frame of the HDR image, a conventional electronic device cannot capture a subject at 90 fps or more, which is at least three times greater than 30 fps, by using a separate device for an HDR image for the purpose of obtaining the HDR image of 30 fps. That is, since most of the recently supplied camera modules support a capture speed of about 60 fps, there was a difficulty in obtaining an HDR image without a separate device.

Additional aspects will be set forth in part in the description which follows and, in part, will be apparent from the description, or may be learned by practice of the presented embodiments.

In accordance with an aspect of the disclosure, an electronic device is provided. The electronic device includes a memory, a camera module, and a processor electrically connected to the memory and the camera module. The processor may be configured to verify brightness of an external object placed outside the electronic device, continuously to obtain a plurality of images through the camera module by sequentially and repeatedly using a first exposure value determined based at least on the brightness, a second exposure value having an exposure value less than the first exposure value, the first exposure value, and a third exposure value having an exposure value greater than the first exposure value, to select continuous at least part of images corresponding to the first exposure value, the second exposure value, and the third exposure value among the plurality of images, when a specified condition is satisfied, and to generate a composite image by using the at least part of images.

In accordance with another aspect of the t disclosure, an electronic device is provided. The electronic device includes a memory, a camera module, a communication circuit configured to communicate with an external electronic device, and a processor electrically connected to the memory, the camera module, and the communication circuit, wherein the processor is configured to verify brightness of an external object, continuously obtain a plurality of images through the camera module by sequentially and repeatedly using a first exposure value determined based at least on the brightness, a second exposure value having an exposure value less than the first exposure value, the first exposure value, and a third exposure value having an exposure value greater than the first exposure value, and transmit the plurality of images to the external electronic device through the communication circuit such that the external electronic device selects continuous at least part of images, which correspond to the first exposure value, the second exposure value, and the third exposure value, from among the plurality of images to generate a composite image by using the at least part of images, when satisfying a specified condition.

In accordance with another aspect of the disclosure, an electronic device is provided. The electronic device includes a memory, a camera module, a communication circuit configured to communicate with an external electronic device, and a processor electrically connected to the memory, the camera module, and the communication circuit, wherein the processor is configured to verify brightness of an external object placed outside the electronic device continuously obtain a plurality of images through the camera module by sequentially and repeatedly using a first exposure value determined based at least on the brightness, a second exposure value having an exposure value less than the first exposure value, the first exposure value, and a third exposure value having an exposure value greater than the first exposure value, select continuous at least part of images corresponding to the first exposure value, the second exposure value, and the third exposure value among the plurality of images, when a specified condition is satisfied, and transmit the at least part of images to the external electronic device through the communication circuit such that the external electronic device generates a composite image by using the at least part of images.

According to various embodiments of the disclosure, it is possible to obtain an HDR image by only changing an exposure value of a camera module without a separate device for the HDR image.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
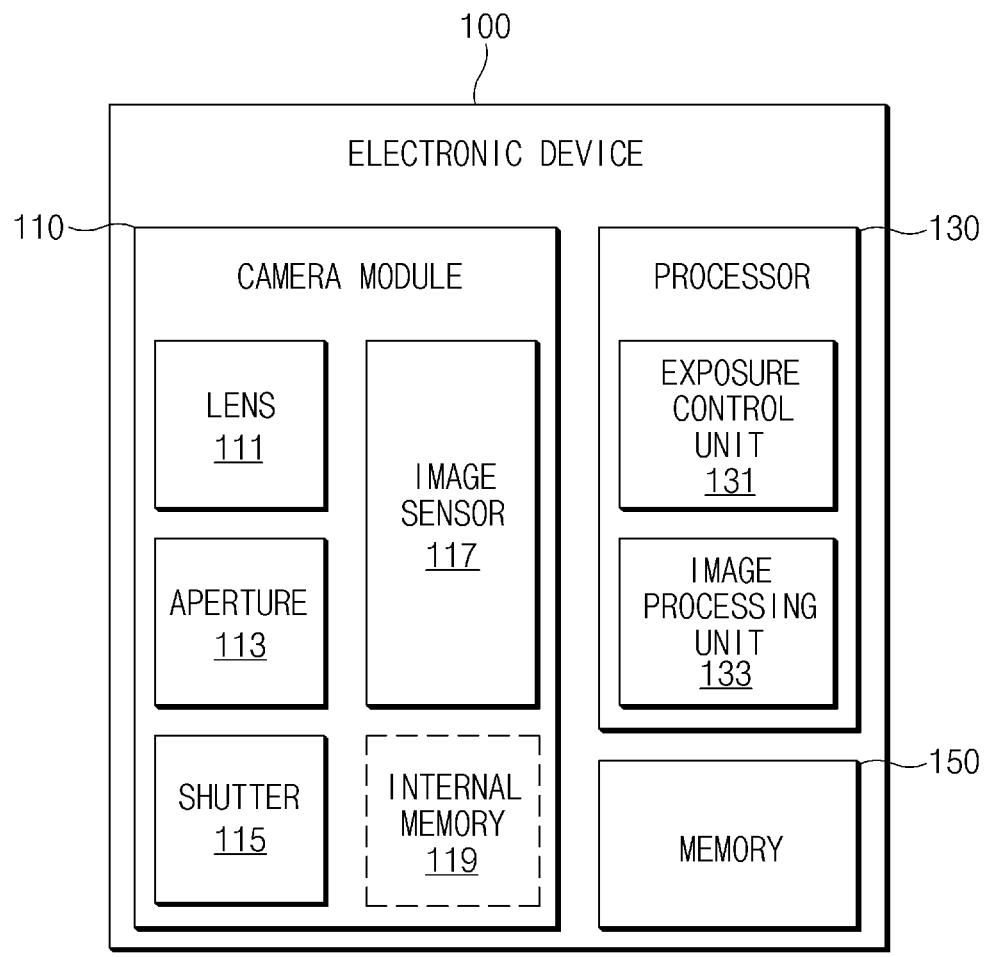
FIG. 1 is a block diagram of an electronic device capable of capturing a high dynamic range (HDR) image according to an embodiment of the disclosure.

FIG. 1 is a block diagram of an electronic device capable of capturing a high dynamic range (HDR) image according to an embodiment of the disclosure.

Referring to FIG. 1, an electronic device 100 may be an imaging device capable of capturing a subject or an external object; for example, the electronic device 100 may be a portable electronic device such as a digital camera, a digital camcorder, a smart phone, or the like.

The electronic device 100 may obtain a still image or a video through capture. According to various embodiments, the electronic device 100 may provide a function such as auto focus, auto exposure, custom white balance, or the like. Furthermore, the electronic device 100 may provide various functions associated with capture such as zoom in, zoom out, continuous shooting, timer shooting, flash on/off, a filter, or the like. A user may set a capture condition to obtain an image in the form that the user desires, by using the functions provided by the electronic device 100.

According to an embodiment, the electronic device 100 may generate an HDR image (or a composite image) by using a plurality of images obtained by capturing a subject at different exposure values through a camera module 110. For example, the electronic device 100 may generate the HDR image for the subject by using a first image obtained by capturing a subject at an appropriate exposure value determined based on the brightness (or luminance) for a subject, a second image obtained by capturing the subject at a low-exposure value having an exposure value less than the appropriate exposure value, and a third image obtained by capturing the subject at a high-exposure value having an exposure value greater than the appropriate exposure value.

According to an embodiment, the electronic device 100 may sequentially and repeatedly change the exposure value of the camera module 110 in a specified order, thereby improving the efficiency of image processing. For example, the electronic device 100 may obtain an image for the subject while sequentially and repeatedly changing the exposure value of the camera module 110 in order (or 1) in order of the appropriate exposure value, the high-exposure value, the appropriate exposure value, and the low-exposure value, 2) in order of the low-exposure value, the appropriate exposure value, the high-exposure value, and the appropriate exposure value, or 3) in order of the high-exposure value, the appropriate exposure value, the low-exposure value, and the appropriate exposure value) of the appropriate exposure value, the low-exposure value, the appropriate exposure value, and the high-exposure value. In this case, the electronic device 100 may generate one frame of the HDR image for a subject by using the first image captured at the appropriate exposure value, the second image captured at the low-exposure value, and the third image captured at the high-exposure value. The third image may be used to generate the next frame of the HDR image for the subject together with a fourth image captured at the appropriate exposure value and a fifth image captured at the low-exposure value depending on the next order of an exposure change. That is, the electronic device 100 may use images captured at the low-exposure value and the high-exposure value, which correspond to the previous order and the next order of the appropriate exposure value, to generate the previous frame and the next frame of the HDR image, respectively. As such, the electronic device 100 may generate the HDR image having frames of the number corresponding to about half the total number of images captured through the camera module 110.

Referring to FIG. 1, the electronic device 100 may include the camera module 110, a processor 130, and a memory 150. However, a configuration of the electronic device 100 is not limited thereto. According to various embodiments, at least one of the above-described components may be omitted, or at least another component may be further included. For example, the electronic device 100 may further include a communication module (or a communication circuit) for communicating with an external device, and a display for outputting an image.

The camera module 110 may include at least one of a lens 111 that receives image light of a subject and converts the light into an image, an aperture 113 that adjusts the amount of light passing through the lens 111, a shutter 115 that allows an image sensor 117 to be exposed to the light passing through the lens 111 during a specific time, the image sensor 117 that receives the image from the lens 111 as a light signal, and an internal memory 119.

For example, the lens 111 may include at least one optical lens; the lens 111 may receive the light that is reflected and input from the subject and may allow an image to be imaged on the photosensitive surface of the image sensor 117. According to an embodiment, the lens 111 may perform a zoom function in response to the signal of the processor 130 and may adjust a focus automatically.

According to an embodiment, the lens 111 may be detachably connected to the electronic device 100. For example, the lens 111 may support a capture function when being connected to the electronic device 100; when not capturing an image, the lens 111 may be separated from the electronic device 100 and stored separately. The lens 111 may have various shapes, and a user may selectively connect the lens 111 to the camera module 110 depending on capture manners or capture purposes.

In various embodiments, the electronic device 100 may further include a lens cover that is formed to cover an exterior appearance of the lens 111. For example, the lens cover may operate such that one surface (e.g., a front surface) of the lens 111 is opened or closed. Even though the lens 111 is connected to the electronic device 100, the lens cover may block the light to prevent capturing of images.

According to various embodiments, the electronic device 100 may further include a separate sensor (e.g., an illuminance sensor, or the like) so as to determine whether the lens cover is coupled or whether the lens cover is opened or closed, through the separate sensor. Whether the lens cover is coupled or whether the lens cover is opened or closed may be provided to the processor 130. As such, the processor 130 may determine a state where it is possible to shoot.

The aperture 113 may adjust the amount of light passing through the lens 111. According to an embodiment, the aperture 113 may be provided in the form of a disk, and a specific area may be opened or closed depending on an aperture value. Since the size of a passage through which light passes varies depending on how much the specific area is opened or closed, the aperture 113 may differently adjust the extent to which light passing through the lens 111 is exposed to the image sensor 117. For example, as the aperture value increases, the extent to which the specific area is closed may increase and the amount of light may decrease; as the aperture value decreases, the extent to which the specific area is opened may increase and the amount of light may increase.

The shutter 115 may allow the aperture 113 to be opened or closed. For example, the electronic device 100 may expose light on the image sensor 117 by opening the shutter 115 and then closing the shutter 115. According to an embodiment, the shutter 115 may adjust the amount of light entering the image sensor 117 through the lens 111, by adjusting the time to open and close between the lens 111 and the image sensor 117 to be long or short. For example, the shutter 115 may differently adjust the extent to which light passing through the lens 111 is exposed to the image sensor 117, depending on the shutter speed at which the shutter 115 is opened or closed.

The image sensor 117 may be disposed at a location at which image light passing through the lens 111 is imaged into an image and may convert the image, which is imaged by the lens 111, into an electrical signal. For example, the image sensor 117 may include a charge-coupled device (CCD) image sensor, a complementary metal-oxide semi-conductor (CMOS) image sensor, or the like. According to an embodiment, the image sensor 117 may differently adjust the amount of light absorbed depending on the sensitivity of the image sensor 117. For example, the amount of light, which is absorbed as the sensitivity of the image sensor 117 increases, may increase; the amount of light, which is absorbed as the sensitivity of the image sensor 117 decreases, may decrease.

The internal memory 119 may temporarily store the image captured through the camera module 110. According to an embodiment, before the shutter 115 is manipulated, the internal memory 119 may store the image captured through the image sensor 117. According to various embodiments, the electronic device 100 may further include a display and may provide the image stored in the internal memory 119 through the display as an image such as a preview, a live view, or the like. In any embodiment, the electronic device 100 may store the image captured by manipulating the shutter 115 in the internal memory 119, and may transmit the image to the memory 150 when a selection input of a user occurs or depending on the set information.

The processor 130 may include one or more of a central processing unit (CPU), an application processor (AP), or a communication processor (CP). The processor 130 may perform data processing or an operation associated with control and/or communication of at least one other element(s) of the electronic device 100. The processor 130 may drive an operating system (OS) or an application program to control a plurality of hardware or software components connected to the processor 130 and may process and compute a variety of data. According to an embodiment of the disclosure, the processor 130 may further include a graphic processing unit (GPU) and/or an image signal processor.

According to an embodiment, the processor 130 may be electrically connected to the camera module 110 so as to control a capture function. For example, the processor 130 may control a function such as auto focus adjustment, auto exposure settings, custom white balance settings, zoom in, zoom out, shooting, continuous shooting, timer shooting, flash on/off, filtering, or the like.

According to an embodiment, the processor 130 may be electrically connected to the internal memory 119, the memory 150, or the display so as to control a function to store, to transmit, or to output the captured image. For example, the processor 130 may store the captured image in the internal memory 119 or the memory 150 and may output the image to the display.

The processor 130 may include an exposure control unit 131 that controls the exposure of the camera module 110 and an image processing unit 133 that processes the image captured through the camera module 110.

The exposure control unit 131 may change at least one of the aperture value, the shutter speed, or the sensitivity of an image sensor. For example, when the brightness of a subject is determined, the exposure control unit 131 may change at least one of the aperture value, the shutter speed, or the sensitivity of an image sensor, depending on the appropriate exposure value determined based at least on the brightness. Furthermore, the exposure control unit 131 may change at least one of the aperture value, the shutter speed, or the sensitivity of an image sensor, depending on the low-exposure value having an exposure value less than the appropriate exposure value or depending on the high-exposure value having an exposure value greater than the appropriate exposure value.

According to an embodiment, when the exposure value of the camera module 110 is changed from the appropriate exposure value to the low-exposure value or is changed from the high-exposure value to the appropriate exposure value, the exposure control unit 131 may increase the aperture value, may increase the shutter speed, or may decrease the sensitivity of the image sensor. In addition, when the exposure value of the camera module 110 is changed from the appropriate exposure value to the high-exposure value or from the low-exposure value to the appropriate exposure value, the exposure control unit 131 may decrease the aperture value, may decrease the shutter speed, or may increase the sensitivity of the image sensor.

According to an embodiment, the exposure control unit 131 may repeatedly change the exposure value of the camera module 110 in a specified order. For example, the exposure control unit 131 may repeatedly change the exposure value of the camera module 110 in order of the appropriate exposure value, the low-exposure value, the appropriate exposure value, and the high-exposure value. That is, the exposure control unit 131 may alternately change the exposure value of the camera module 110 to the low-exposure value or the high-exposure value in the previous or next order with respect to the appropriate exposure value. When the exposure value of the camera module 110 is alternately changed to the low-exposure value or the high-exposure value in the previous or next order with respect to the appropriate exposure value, the load of the camera module 110 associated with the change of the exposure value may be reduced, as compared than the case where the exposure value of the camera module 110 is changed from the high-exposure value to the low-exposure value or from the low-exposure value to the high-exposure value by a lot.

The image processing unit 133 may process the image captured through the camera module 110. For example, the image processing unit 133 may encode the captured image in a specified format. Furthermore, the image processing unit 133 may store the captured image or the encoded image in the memory 150. According to an embodiment, while repeatedly changing the exposure value of the camera module 110 in a specified order, the image processing unit 133 may generate a HDR image by using the captured plurality of images.

For example, the image processing unit 133 may generate the n-th frame of the HDR image together with the n-th image captured at the appropriate exposure value by using the (n−1)-th image and the (n+1)-th image that respectively correspond to the previous order and the next order with respect to the n-th image. The image processing unit 133 may sequentially and repeatedly combine frames to generate the entire frame of the HDR image. For example, when the (n−1)-th image is an image at the low-exposure value, the (n+1)-th image may be an image captured at the high-exposure value; when the (n−1)-th image is an image at the high-exposure value, the (n+1)-th image may be an image captured at the low-exposure value.

The memory 150 may include a volatile and/or nonvolatile memory. For example, the memory 150 may store instructions or data associated with at least one other component(s) of the electronic device 100. According to an embodiment, the memory 150 may store instructions associated with exposure settings of the camera module 110. As such, when the instructions are executed by the processor 130, the processor 130 may perform a function associated with exposure settings of the camera module 110. Moreover, the memory 150 may store the image captured through the camera module 110. For another example, the memory 150 may store the HDR image generated by the image processing unit 133. The memory 150 may include an internal memory or an external memory.

Figure 2:
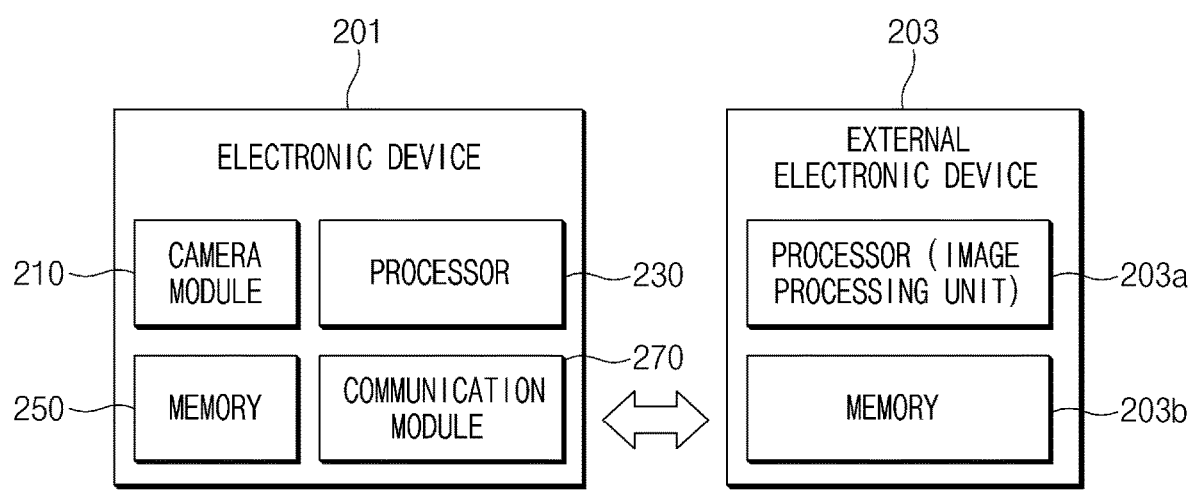
FIG. 2 is a diagram illustrating capturing an HDR image by different electronic devices according to an embodiment of the disclosure.

FIG. 2 is a diagram illustrating capturing an HDR image by different electronic devices according to an embodiment of the disclosure.

Referring to FIG. 2, a part of components of an electronic device 201 illustrated may perform a function the same as or similar to that of the components of the electronic device 100 illustrated in FIG. 1. For example, a camera module 210, a processor 230, and a memory 250 of the electronic device 201 illustrated in FIG. 2 may perform a function the same as or similar to that of the camera module 110, the processor 130, and the memory 150 of the electronic device 100 illustrated in FIG. 1, respectively. In FIG. 2, the descriptions about the configuration and the function the same as or similar to those given with reference to FIG. 1 may not be repeated here.

Referring to FIG. 2, the electronic device 201 may include the camera module 210, the processor 230, the memory 250, and a communication module 270. The camera module 210 may capture a still image and a video for a subject; while repeatedly changing the exposure value of the camera module 210 in a specified order, the processor 230 may control the capture function of the camera module 210. Furthermore, the processor 230 may store the images captured through the camera module 210 in the memory 250 and may generate an HDR image by using at least part of images among the captured images.

The communication module 270 (or a communication circuit) may support the communication channel establishment between the electronic device 201 and an external electronic device 203 and the execution of wired or wireless communication through the established communication channel. According to an embodiment, the communication module 270 may transmit the images captured through the camera module 210 to the external electronic device 203 under control of the processor 230. In another embodiment, the communication module 270 may transmit at least one image set, which is composed of a first image captured at an appropriate exposure value, a second image captured at a low-exposure value, and a third image captured at a high-exposure value, from among the captured images to the external electronic device 203 under control of the processor 230.

The external electronic device 203 (e.g., a server) receiving an image from the electronic device 201 may include a processor 203a and a memory 203b. The processor 203a of the external electronic device 203 may identically or similarly perform a function associated with image processing among the functions of the processor 130 of the electronic device 100 illustrated in FIG. 1. For example, the processor 203a of the external electronic device 203 may perform a function the same as or similar to that of the image processing unit 133 included in the processor 130 of FIG. 1. According to an embodiment, when receiving a plurality of images from the electronic device 201, the processor 203a of the external electronic device 203 may generate an HDR image by using at least part of images among the images. For example, when receiving a plurality of images, which are captured while the exposure value of the camera module 210 included in the electronic device 201 is repeatedly changed in a specified order, from the electronic device 201, the processor 203a of the external electronic device 203 may select at least part of continuous images corresponding to the low-exposure value, the appropriate exposure value, and the high-exposure value (or the high-exposure value, the appropriate exposure value, and the low-exposure value) of the camera module 210 among the plurality of images to generate the HDR image by using the selected at least part of images. For example, when receiving, from the electronic device 201, at least part of continuous images corresponding to the low-exposure value, the appropriate exposure value, and the high-exposure value (or the high-exposure value, the appropriate exposure value, and the low-exposure value) of the camera module 210 among a plurality of images, which are captured while the exposure value of the camera module 210 included in the electronic device 201 is repeatedly changed in a specified order, the processor 203a of the external electronic device 203 may generate the HDR image by using the received at least part of images.

According to an embodiment, the processor 203a of the external electronic device 203 may store the images received from the electronic device 201, in the memory 203b. Furthermore, the processor 203a of the external electronic device 203 may store the generated HDR image in the memory 203b.

Figure 3:
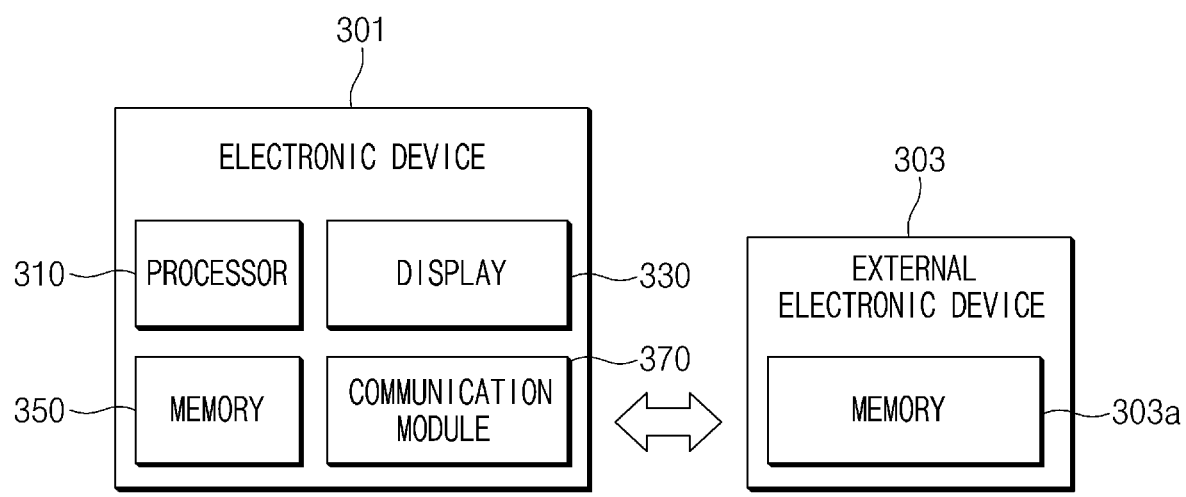
FIG. 3 is a diagram illustrating an environment in which an HDR image is transmitted by an external electronic device and displayed in an electronic device according to an embodiment of the disclosure.

FIG. 3 is a diagram illustrating an environment in which an HDR image is transmitted by an external electronic device and displayed in an electronic device according to an embodiment of the disclosure.

Referring to FIG. 3, a part of components of an electronic device 301 illustrated in FIG. 3 may perform a function the same as or similar to that of the components of the electronic device 100 illustrated in FIG. 1 or that of the components of the electronic device 201 illustrated in FIG. 2. In FIG. 3, the descriptions about the configuration and the function the same as or similar to those given with reference to FIG. 1 or 2 may not be repeated here. Only the configuration and the function associated with the display of the HDR image will be described.

Referring to FIG. 3, the electronic device 301 may include a processor 310, a display 330, a memory 350, and a communication module 370. The processor 310 may display an image on the display 330. According to an embodiment, the processor 310 may decode the image encoded in a specific format and may display the image on the display 330 by using the decoded data. In any embodiment, the processor 310 may distinguish whether the encoded image is a standard dynamic range (SDR) image or an HDR image and may perform a decoding process suitable for the type of the encoded image. For example, when the encoded image is the SDR image, the processor 310 may perform decoding through an SDR decoder; when the encoded image is the HDR image, the processor 310 may perform decoding through an HDR decoder.

The display 330 may display various content (e.g., texts, images, video, icons, symbols, or the like) to a user. For example, the display 330 may output the image stored in the memory 350, on a screen. The display 330 may include, for example, a liquid crystal display (LCD), a light-emitting diode (LED) display, an organic LED (OLED) display, a microelectromechanical systems (MEMS) display, or an electronic paper display. According to an embodiment, the display 330 may include a touch screen and may receive, for example, a touch, gesture, proximity, or a hovering input using an electronic pen or a part of a user's body.

According to an embodiment, the communication module 370 (or a communication circuit) may receive the HDR image stored in a memory 303a of an external electronic device 303, from an external electronic device 303. In this case, the processor 310 may display the HDR image received through the communication module 370, on the display 330. Furthermore, the processor 310 may also store the received HDR image in the memory 350.

In any embodiment, the electronic device 301 may further include a camera module; when obtaining a plurality of images for a subject through the camera module, the processor 310 may generate the HDR image by using at least part of images among the plurality of images and may display the generated HDR image on the display 330.

As described above, according to various embodiments, an electronic device (e.g., the electronic device 100) may include a memory (e.g., the memory 150), a camera module (e.g., the camera module 110), and a processor (e.g., the processor 130) electrically connected to the memory and the camera module. The processor may be configured to verify brightness of an external object placed outside the electronic device, continuously to obtain a plurality of images through the camera module by sequentially and repeatedly using a first exposure value (e.g., appropriate exposure value) determined based at least on the brightness, a second exposure value (e.g., low-exposure value) having an exposure value less than the first exposure value, the first exposure value, and a third exposure value (e.g., high-exposure value) having an exposure value greater than the first exposure value, to select continuous at least part of images corresponding to the first exposure value, the second exposure value, and the third exposure value among the plurality of images, when a specified condition is satisfied, and to generate a composite image by using the at least part of images.

According to various embodiments, the processor may be configured to verify the brightness of the external object measured by using an image sensor included in the camera module, as at least part of the verifying of the brightness of the external object.

According to various embodiments, the electronic device may further include an illuminance sensor. The processor may be configured to verify the brightness of the external object measured by using the illuminance sensor, as at least part of the verifying of the brightness of the external object.

According to various embodiments, the processor may be configured to determine to satisfy the specified condition, when at least one of a condition of receiving an input corresponding to capture completion or a condition that one interval composed of specific time units expires is satisfied.

According to various embodiments, the processor may be configured to store at least one of the plurality of images and the composite image in the memory.

According to various embodiments, the electronic device may further include a display (e.g., the display 330). The processor may be configured to output the composite image on the display.

According to various embodiments, the number of frames of the composite image is about half the total number of the plurality of images.

As described above, according to various embodiments, an electronic device (e.g., the electronic device 201) may include a memory (e.g., the memory 250), a camera module (e.g., the camera module 210), a communication circuit (e.g., the communication module 270) communicating with an external electronic device, and a processor (e.g., the processor 230) electrically connected to the memory, the camera module, and the communication circuit. The processor may be configured to verify brightness of an external object placed outside the electronic device, continuously to obtain a plurality of images through the camera module by sequentially and repeatedly using a first exposure value (e.g., appropriate exposure value) determined based at least on the brightness, a second exposure value (e.g., low-exposure value) having an exposure value less than the first exposure value, the first exposure value, and a third exposure value (e.g., high-exposure value) having an exposure value greater than the first exposure value, and to transmit the plurality of images to the external electronic device through the communication circuit such that the external electronic device selects continuous at least part of images, which correspond to the first exposure value, the second exposure value, and the third exposure value, from among the plurality of images to generate a composite image by using the at least part of images, when satisfying a specified condition.

According to various embodiments, the processor may be configured to verify the brightness of the external object measured by using an image sensor included in the camera module, as at least part of the verifying of the brightness of the external object.

According to various embodiments, the electronic device may further include an illuminance sensor. The processor may be configured to verify the brightness of the external object measured by using the illuminance sensor, as at least part of the verifying of the brightness of the external object.

According to various embodiments, the processor may be configured to determine to satisfy the specified condition, when at least one of a condition of receiving an input corresponding to capture completion, a condition that one interval composed of specific time units expires, or a condition of receiving an input associated with image transmission to the external electronic device is satisfied.

According to various embodiments, the electronic device may further include a display (e.g., the display 330). The processor may be configured to receive the composite image from the external electronic device through the communication circuit and to output the received composite image on the display.

According to various embodiments, the processor may be configured to store the received composite image in the memory.

As described above, according to various embodiments, an electronic device (e.g., the electronic device 201) may include a memory (e.g., the memory 250), a camera module (e.g., the camera module 210), a communication circuit (e.g., the communication module 270) communicating with an external electronic device, and a processor (e.g., the processor 230) electrically connected to the memory, the camera module, and the communication circuit. The processor may be configured to verify brightness of an external object placed outside the electronic device, continuously to obtain a plurality of images through the camera module by sequentially and repeatedly using a first exposure value (e.g., appropriate exposure value) determined based at least on the brightness, a second exposure value (e.g., low-exposure value) having an exposure value less than the first exposure value, the first exposure value, and a third exposure value (e.g., high-exposure value) having an exposure value greater than the first exposure value, to select continuous at least part of images corresponding to the first exposure value, the second exposure value, and the third exposure value among the plurality of images, when a specified condition is satisfied, and to transmit the at least part of images to the external electronic device through the communication circuit such that the external electronic device generates a composite image by using the at least part of images.

According to various embodiments, the processor may be configured to verify the brightness of the external object measured by using an image sensor included in the camera module, as at least part of the verifying of the brightness of the external object.

According to various embodiments, the electronic device may further include an illuminance sensor. The processor may be configured to verify the brightness of the external object measured by using the illuminance sensor, as at least part of the verifying of the brightness of the external object.

According to various embodiments, the processor may be configured to determine to satisfy the specified condition, when at least one of a condition of receiving an input corresponding to capture completion, a condition that one interval composed of specific time units expires, or a condition of receiving an input associated with image transmission to the external electronic device is satisfied.

According to various embodiments, the electronic device may further include a display (e.g., the display 330). The processor may be configured to receive the composite image from the external electronic device through the communication circuit and to output the received composite image on the display.

According to various embodiments, the processor may be configured to store the received composite image in the memory.

As described above, according to various embodiments, an electronic device (e.g., the electronic device 201) may include a memory (e.g., the memory 250), a camera module (e.g., the camera module 210), a communication circuit (e.g., the communication module 270) communicating with an external electronic device, and a processor (e.g., the processor 230) electrically connected to the memory, the camera module, and the communication circuit. The processor may be configured to verify brightness of an object outside the electronic device, to obtain a first image (e.g., first appropriate exposure image) and a second image (e.g., second appropriate exposure image) sequentially and repeatedly through the camera module by using a first exposure value (e.g., appropriate exposure value) determined based at least on the brightness, to generate a third image (e.g., low-exposure image) and a fourth image (e.g., high-exposure image) repeatedly by using the first image and the second image, which are obtained sequentially and repeatedly by using the first exposure value, to arrange a plurality of images continuously and repeatedly in order of the first image, the third image, the second image, and the fourth image, to select continuous at least part of images, which correspond to the first exposure value, the second exposure value, and the third exposure value, from among the plurality of images, when satisfying a specified condition, and to generate a composite image by using the at least part of images. The repeatedly generated third image may be generated by applying a second exposure value (e.g., low-exposure value) less than the first exposure value to the repeatedly obtained first image. The repeatedly generated fourth image may be generated by applying a third exposure value (e.g., high-exposure value) greater than the first exposure value to the repeatedly obtained second image.

Figure 4:
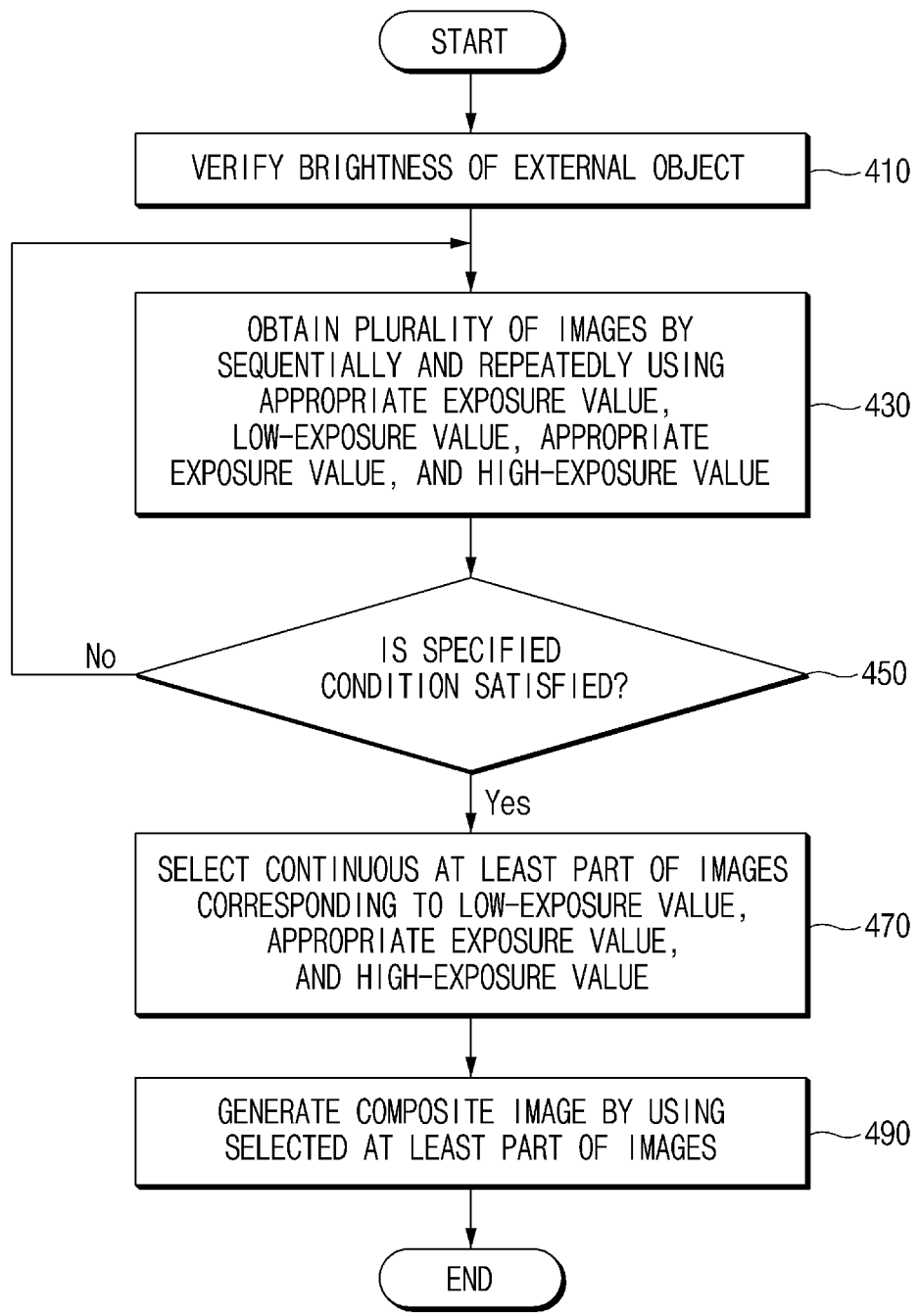
FIG. 4 is a flowchart of a method for capturing an HDR image according to an embodiment of the disclosure.

FIG. 4 is a flowchart of a method of an electronic device for capturing an HDR image according to an embodiment of the disclosure.

Referring to FIG. 4, in operation 410, a processor (e.g., the processor 130 or 230) of an electronic device (e.g., the electronic device 100 or 201) may determine the brightness of an external object (or a subject). According to an embodiment, the processor may measure the brightness of the external object by using an image sensor (e.g., the image sensor 117) included in a camera module (e.g., the camera module 110 or 210) and may verify the measured brightness. In another embodiment, the processor may measure the brightness of the external object through an illuminance sensor included in the electronic device and may verify the measured brightness.

In operation 430, the processor may continuously obtain a plurality of images by sequentially and repeatedly using the order of an appropriate exposure value, a low-exposure value, the appropriate exposure value, and a high-exposure value (or an order of the appropriate exposure value, the high-exposure value, the appropriate exposure value, and the low-exposure value, an order of the low-exposure value, the appropriate exposure value, the high-exposure value, and the appropriate exposure value, or an order of the high-exposure value, the appropriate exposure value, the low-exposure value, and the appropriate exposure value). According to an embodiment, the processor may control the camera module so as continuously to capture the external object while sequentially and repeatedly changing the exposure value of the camera module 110 in order (or in order of the appropriate exposure value, the high-exposure value, the appropriate exposure value, and the low-exposure value, in order of the low-exposure value, the appropriate exposure value, the high-exposure value, and the appropriate exposure value, or in order of the high-exposure value, the appropriate exposure value, the low-exposure value, and the appropriate exposure value) of the appropriate exposure value, the low-exposure value, the appropriate exposure value, and the high-exposure value. The change of the exposure value of the camera module may be performed by adjusting the aperture value, the shutter speed, or the sensitivity of an image sensor. Furthermore, compared with the case of changing the exposure value of the camera module from the high-exposure value to the low-exposure value or from the low-exposure value to the high-exposure value, the processor may alternately change the exposure value of the camera module to the low-exposure value and the high-exposure value in the previous and next orders with respect to the appropriate exposure value, thereby reducing the load of the camera module. According to various embodiments, the processor may set the exposure value of the camera module to the appropriate exposure value and thus may control the camera module so as to capture the external object. The processor may set the exposure value of the camera module to the appropriate exposure value to obtain an appropriate exposure image having the appropriate exposure value of the external object and may generate a low-exposure image having the low-exposure value and a high-exposure image having the high-exposure value by using the appropriate exposure image.

In operation 450, the processor may determine whether a specified condition is satisfied. The specified condition may include at least one of a condition of receiving an input corresponding to capture completion or a condition that one interval composed of specific time units expires.

According to an embodiment, when the specified condition is not satisfied, the procedure may return to operation 430.

According to an embodiment, when the specified condition is satisfied, in operation 470, the processor may select the continuous at least part of images corresponding to the appropriate exposure value, the low-exposure value, and the high-exposure value. For example, the processor may select at least one image set, which is composed of a first image captured at the appropriate exposure value, a second image captured at the low-exposure value, and a third image captured at a high-exposure value, from among the images captured through the camera module.

In operation 490, the processor may generate a composite image (or an HDR image) by using the selected at least part of images. According to an embodiment, the processor may generate at least one frame of the HDR image by using at least one image set composed of the first image captured at the appropriate exposure value, the second image captured at the low-exposure value, and the third image captured at the high-exposure value.

Figure 5:
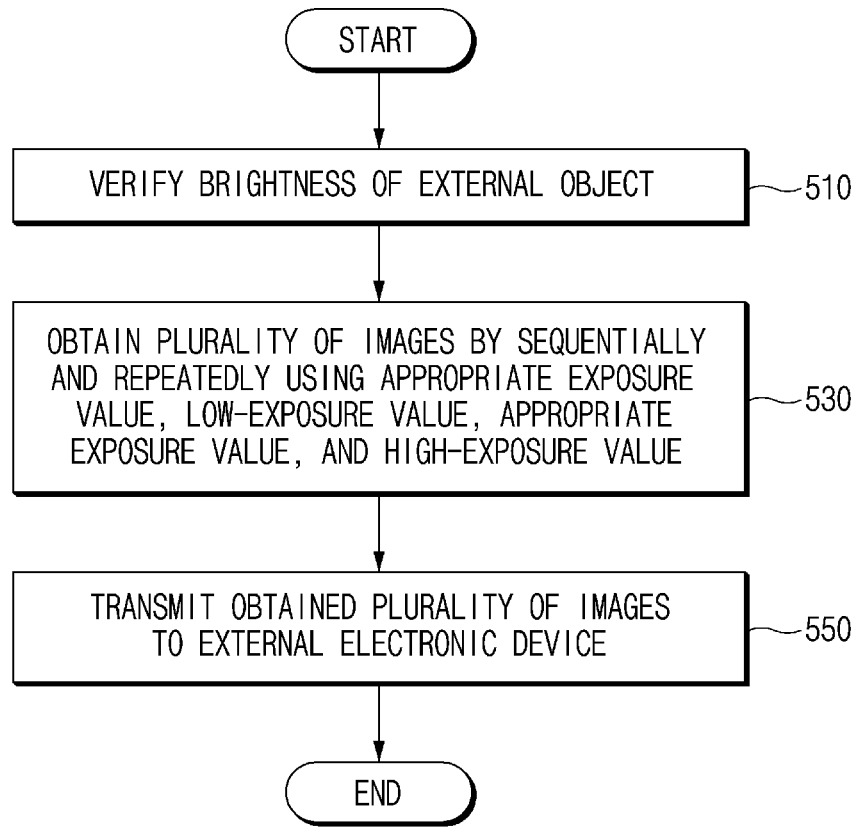
FIG. 5 is a flowchart illustrating a method of an electronic device that transmits captured images to an external electronic device to generate an HDR image according to an embodiment of the disclosure.

FIG. 5 is a flowchart illustrating of a method of an electronic device that transmits captured images to an external electronic device to generate an HDR image according to an embodiment of the disclosure.

Referring to FIG. 5, in operation 510, the processor (e.g., the processor 130 or 230) of an electronic device (e.g., the electronic device 100 or 201) may determine the brightness of an external object. According to an embodiment, the processor may measure the brightness of the external object by using an image sensor included in a camera module (e.g., the camera module 110 or 210) and may verify the measured brightness. In another embodiment, the processor may measure the brightness of the external object through an illuminance sensor included in the electronic device and may verify the measured brightness.

In operation 530, the processor may continuously obtain a plurality of images by sequentially and repeatedly using the order of an appropriate exposure value, a low-exposure value, the appropriate exposure value, and a high-exposure value (or an order of the appropriate exposure value, the high-exposure value, the appropriate exposure value, and the low-exposure value, an order of the low-exposure value, the appropriate exposure value, the high-exposure value, and the appropriate exposure value, or an order of the high-exposure value, the appropriate exposure value, the low-exposure value, and the appropriate exposure value). According to an embodiment, the processor may control the camera module so as continuously to capture the external object while sequentially and repeatedly changing the exposure value of the camera module 110 in order (or in order of the appropriate exposure value, the high-exposure value, the appropriate exposure value, and the low-exposure value, in order of the low-exposure value, the appropriate exposure value, the high-exposure value, and the appropriate exposure value, or in order of the high-exposure value, the appropriate exposure value, the low-exposure value, and the appropriate exposure value) of the appropriate exposure value, the low-exposure value, the appropriate exposure value, and the high-exposure value. According to various embodiments, the processor may set the exposure value of the camera module to the appropriate exposure value and thus may control the camera module so as to capture the external object. The processor may set the exposure value of the camera module to the appropriate exposure value to obtain an appropriate exposure image having the appropriate exposure value of the external object and may generate a low-exposure image having the low-exposure value and a high-exposure image having the high-exposure value by using the appropriate exposure image.

In operation 550, a communication module (e.g., the communication module 270) of the electronic device may transmit the plurality of images obtained under control of the processor to an external electronic device (e.g., the external electronic device 203). In this case, the external electronic device receiving a plurality of images from the electronic device may generate the HDR image by using at least part of images among the images. For example, the external electronic device may generate at least one frame of the HDR image by using at least one image set composed of the first image captured at the appropriate exposure value, the second image captured at the low-exposure value, and the third image captured at the high-exposure value.

Figure 6:
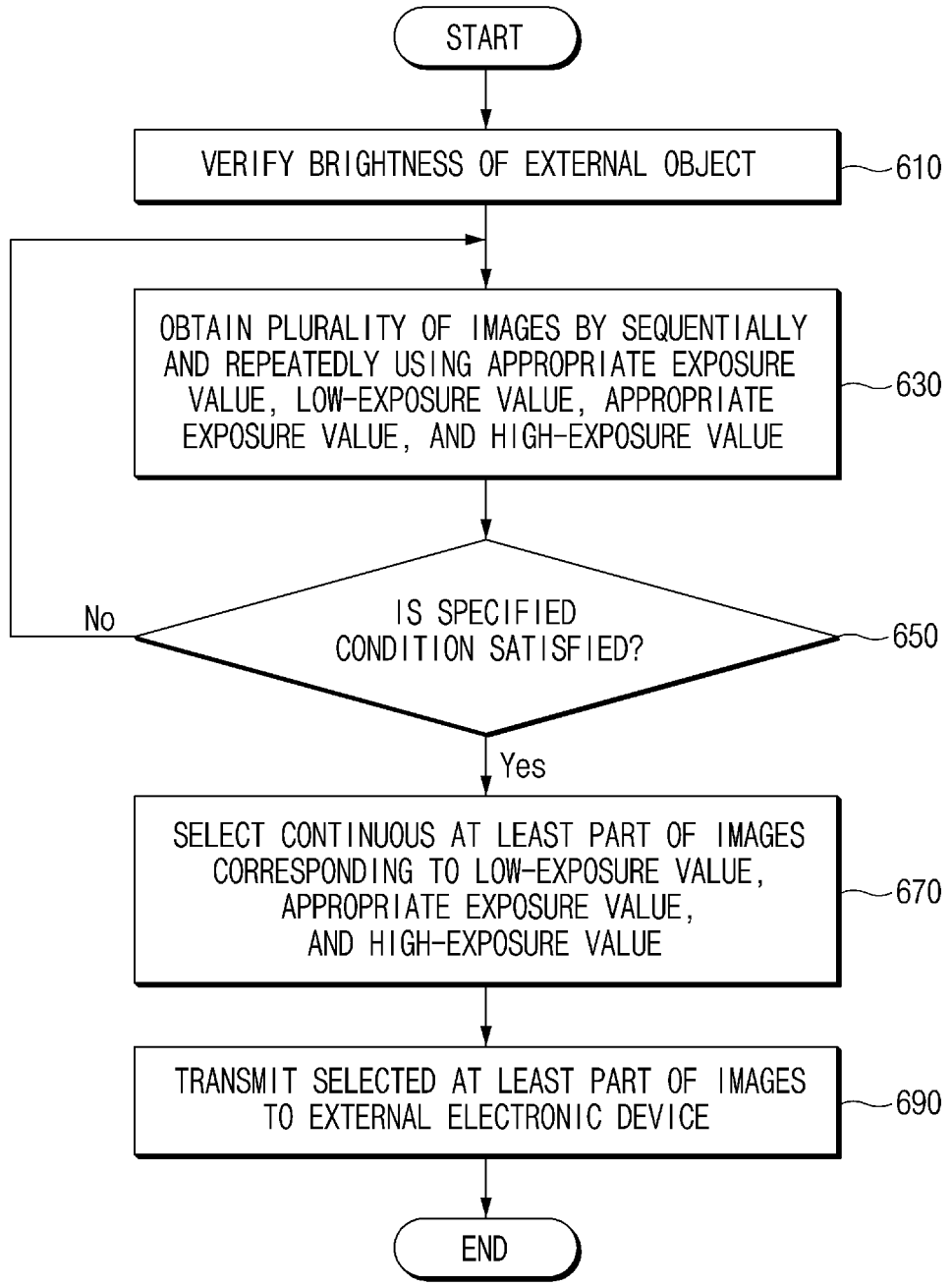
FIG. 6 is a flowchart of a method of an electronic device that transmits captured images to an external electronic device to generate an HDR image according to an embodiment of the disclosure.

FIG. 6 is a flowchart of a method of an electronic device that transmits captured images to an external electronic device to generate an HDR image according to an embodiment of the disclosure.

Referring to FIG. 6, in operation 610, the processor (e.g., the processor 130 or 230) of an electronic device (e.g., the electronic device 100 or 201) may determine the brightness of an external object. According to an embodiment, the processor may measure the brightness of the external object by using an image sensor included in a camera module (e.g., the camera module 110 or 210) and may verify the measured brightness. In any embodiment, the processor may measure the brightness of the external object through an illuminance sensor included in the electronic device and may verify the measured brightness.

In operation 630, the processor may continuously obtain a plurality of images by sequentially and repeatedly using the order of an appropriate exposure value, a low-exposure value, the appropriate exposure value, and a high-exposure value (or an order of the appropriate exposure value, the high-exposure value, the appropriate exposure value, and the low-exposure value, an order of the low-exposure value, the appropriate exposure value, the high-exposure value, and the appropriate exposure value, or an order of the high-exposure value, the appropriate exposure value, the low-exposure value, and the appropriate exposure value). According to an embodiment, the processor may control the camera module so as continuously to capture the external object while sequentially and repeatedly changing the exposure value of the camera module 110 in order (or in order of the appropriate exposure value, the high-exposure value, the appropriate exposure value, and the low-exposure value, in order of the low-exposure value, the appropriate exposure value, the high-exposure value, and the appropriate exposure value, or in order of the high-exposure value, the appropriate exposure value, the low-exposure value, and the appropriate exposure value) of the appropriate exposure value, the low-exposure value, the appropriate exposure value, and the high-exposure value. According to various embodiments, the processor may set the exposure value of the camera module to the appropriate exposure value and thus may control the camera module so as to capture the external object. The processor may set the exposure value of the camera module to the appropriate exposure value to obtain an appropriate exposure image having the appropriate exposure value of the external object and may generate a low-exposure image having the low-exposure value and a high-exposure image having the high-exposure value by using the appropriate exposure image.

In operation 650, the processor may determine whether a specified condition is satisfied. The specified condition may include at least one of a condition of receiving an input corresponding to capture completion, a condition that one interval composed of specific time units expires, or a condition of receiving an input associated with image transmission to the external electronic device.

According to an embodiment, when the specified condition is not satisfied, the procedure may return to operation 630.

According to an embodiment, when the specified condition is satisfied, in operation 670, the processor may select the continuous at least part of images corresponding to the appropriate exposure value, the low-exposure value, and the high-exposure value. For example, the processor may select at least one image set, which is composed of a first image captured at the appropriate exposure value, a second image captured at the low-exposure value, and a third image captured at a high-exposure value, from among the images captured through the camera module.

In operation 690, a communication module (e.g., the communication module 270) of the electronic device may transmit the at least part of images selected under control of the processor to an external electronic device (e.g., the external electronic device 203). In this case, the external electronic device receiving the at least part of images from the electronic device may generate the HDR image by using the at least part of images.

As described above, according to various embodiments, a method of generating a composite image by using a plurality of images having different exposure values may include verifying brightness of an object outside the electronic device, continuously obtaining a plurality of images through a camera module by sequentially and repeatedly using a first exposure value (e.g., appropriate exposure value) determined based at least on the brightness, a second exposure value (e.g., low-exposure value) having an exposure value less than the first exposure value, the first exposure value, and a third exposure value (e.g., high-exposure value) having an exposure value greater than the first exposure value, selecting continuous at least part of images corresponding to the first exposure value, the second exposure value, and the third exposure value among the plurality of images, when a specified condition is satisfied, and generating a composite image by using the at least part of images.

According to various embodiments, the verifying of the brightness of the external object may include verifying the brightness of the external object measured by using an image sensor included in the camera module.

According to various embodiments, the verifying of the brightness of the external object may include verifying the brightness of the external object measured by using an illuminance sensor.

According to various embodiments, the generating of the composite image by using the at least part of images may further include determining to satisfy the specified condition, when at least one of a condition of receiving an input corresponding to capture completion or a condition that one interval composed of specific time units expires is satisfied.

According to various embodiments, the generating of the composite image by using the at least part of images may further include storing at least one of the plurality of images and the composite image in a memory.

According to various embodiments, the generating of the composite image may further include outputting the second image on a display.

According to various embodiments, the number of frames of the composite image is about half the total number of the plurality of images.

As described above, according to various embodiments, a method of generating a composite image by using a plurality of images having different exposure values may include verifying brightness of an object outside the electronic device, continuously obtaining a plurality of images through a camera module by sequentially and repeatedly using a first exposure value (e.g., appropriate exposure value) determined based at least on the brightness, a second exposure value (e.g., low-exposure value) having an exposure value less than the first exposure value, the first exposure value, and a third exposure value (e.g., high-exposure value) having an exposure value greater than the first exposure value, selecting continuous at least part of images corresponding to the first exposure value, the second exposure value, and the third exposure value among the plurality of images, when a specified condition is satisfied, and transmitting the plurality of images to the external electronic device through the communication circuit such that the external electronic device generates a composite image by using the at least part of images.

According to various embodiments, the verifying of the brightness of the external object may include verifying the brightness of the external object measured by using an image sensor included in the camera module.

According to various embodiments, the verifying of the brightness of the external object may include verifying the brightness of the external object measured by using an illuminance sensor.

According to various embodiments, the generating of the composite image may further include determining to satisfy the specified condition, when at least one of a condition of receiving an input corresponding to capture completion, a condition that one interval composed of specific time units expires, or a condition of receiving an input associated with image transmission to the external electronic device is satisfied.

According to various embodiments, the generating of the composite image may further include receiving the composite image from the external electronic device through the communication circuit and outputting the received composite image on a display.

According to various embodiments, the generating of the composite image may further include storing the received the composite image in a memory.

As described above, according to various embodiments, a method of generating a composite image by using a plurality of images having different exposure values may include verifying brightness of an object outside the electronic device, continuously obtaining a plurality of images through a camera module by sequentially and repeatedly using a first exposure value (e.g., appropriate exposure value) determined based at least on the brightness, a second exposure value (e.g., low-exposure value) having an exposure value less than the first exposure value, the first exposure value, and a third exposure value (e.g., high-exposure value) having an exposure value greater than the first exposure value, selecting continuous at least part of images corresponding to the first exposure value, the second exposure value, and the third exposure value among the plurality of images, when a specified condition is satisfied, and transmitting the at least part of images to the external electronic device through the communication circuit such that the external electronic device generates a composite image by using the at least part of images.

According to various embodiments, the verifying of the brightness of the external object may include verifying the brightness of the external object measured by using an image sensor included in the camera module.

According to various embodiments, the verifying of the brightness of the external object may include verifying the brightness of the external object measured by using an illuminance sensor.

According to various embodiments, the generating of the composite image may further include determining to satisfy the specified condition, when at least one of a condition of receiving an input corresponding to capture completion, a condition that one interval composed of specific time units expires, or a condition of receiving an input associated with image transmission to the external electronic device is satisfied.

According to various embodiments, the generating of the composite image may further include receiving the composite image from the external electronic device through the communication circuit and outputting the received composite image on a display.

According to various embodiments, the generating of the composite image may further include storing the received the composite image in a memory.

As described above, according to various embodiments, a method of generating a composite image by using a plurality of images having different exposure values may include verifying brightness of an object outside the electronic device, obtaining a first image (e.g., first appropriate exposure image) and a second image (e.g., second appropriate exposure image) sequentially and repeatedly through the camera module by using a first exposure value (e.g., appropriate exposure value) determined based at least on the brightness, generating a third image (e.g., low-exposure image) and a fourth image (e.g., high-exposure image) repeatedly by using the first image and the second image, which are obtained sequentially and repeatedly by using the first exposure value, arranging a plurality of images continuously and repeatedly in order of the first image, the third image, the second image, and the fourth image, selecting continuous at least part of images, which correspond to the first exposure value, the second exposure value, and the third exposure value, from among the plurality of images, when satisfying a specified condition, and generating a composite image by using the at least part of images. The repeatedly generated third image may be generated by applying a second exposure value (e.g., low-exposure value) less than the first exposure value to the repeatedly obtained first image. The repeatedly generated fourth image may be generated by applying a third exposure value (e.g., high-exposure value) greater than the first exposure value to the repeatedly obtained second image.

Figure 7:
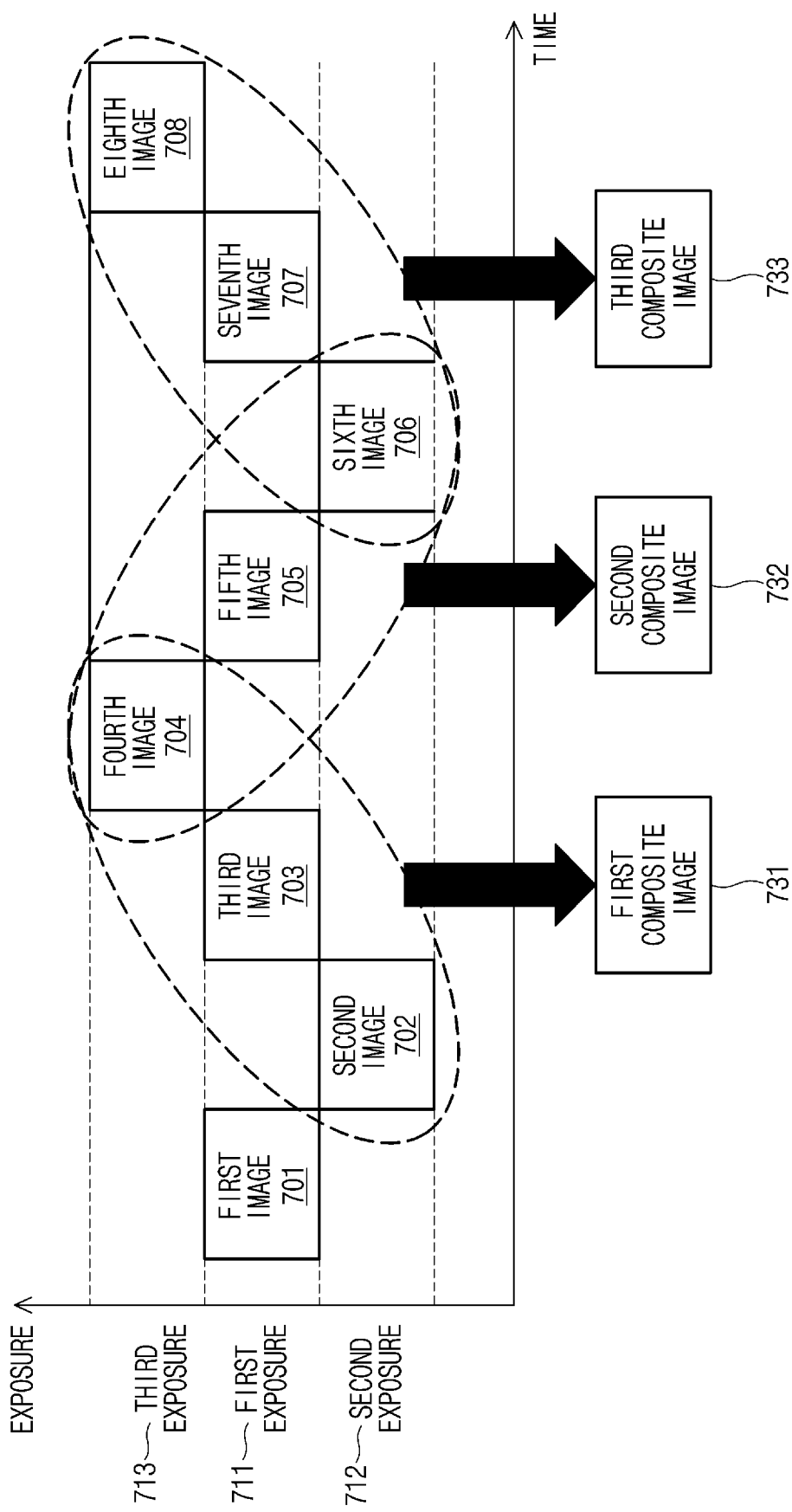
FIG. 7 is a view illustrating an exposure value change of a camera module according to an embodiment of the disclosure.

FIG. 7 is a view illustrating an exposure value change of a camera module according to an embodiment of the disclosure.

Referring to FIG. 7, while repeatedly changing the exposure value of a camera module (e.g., the camera module 110 or 210) in a specified order, an electronic device (e.g., the electronic device 100 or 201) may continuously capture an external object. According to an embodiment, when the brightness of the external object is verified, the processor may control the camera module so as continuously to capture the external object, while repeatedly changing the exposure value of the camera module in order of a first exposure value 711 (e.g., an appropriate exposure value) determined based at least on the brightness, a second exposure value 712 (e.g., a low-exposure value) having an exposure value less than the first exposure value 711, the first exposure value 711, and a third exposure value 713 having an exposure value greater than the first exposure value 711. For example, as illustrated in FIG. 7, the processor may repeatedly change the exposure value of the camera module in order of the first exposure value 711, the second exposure value 712, the first exposure value 711, and the third exposure value 713; as such, the camera module may obtain a first image 701 captured at the first exposure value 711, a second image 702 captured at the second exposure value 712, a third image 703 captured at the first exposure value 711, and a fourth image 704 captured at the third exposure value 713; repeatedly, the camera module may obtain a fifth image 705 captured at the first exposure value 711, a sixth image 706 captured at the second exposure value 712, a seventh image 707 captured at the first exposure value 711, and an eighth image 708 captured at the third exposure value 713. In addition, afterward, until an input corresponding to capture completion is received, the electronic device may obtain images while sequentially and repeatedly changing the above-described exposure value.

When obtaining a plurality of images obtained by continuously capturing the external object through the camera module, the processor may generate a composite image by using the (n−1)-th image and the (n+1)-th image, which are respectively obtained before and after the n-th image, together with the n-th image captured at the appropriate exposure value (e.g., the first exposure value 711). Herein, when the (n−1)-th image is an image at the low-exposure value (e.g., the second exposure value 712), the (n+1)-th image may be an image captured at the high-exposure value (e.g., the third exposure value 713); when the (n−1)-th image is an image at the high-exposure value, the (n+1)-th image may be an image captured at the low-exposure value. For example, the processor may generate a first composite image 731 together with the third image 703 captured at the first exposure value 711, by using the second image 702 captured at the second exposure value 712 and the fourth image 704 captured at the third exposure value 713, which are respectively obtained before and after the third image 703. Furthermore, the processor may generate a second composite image 732 together with the fifth image 705 captured at the first exposure value 711, by using the fourth image 704 captured at the third exposure value 713 and the sixth image 706 captured at the second exposure value 712, which are respectively obtained before and after the fifth image 705; the processor may generate a third composite image 733 together with the seventh image 707 captured at the first exposure value 711, by using the sixth image 706 captured at the second exposure value 712 and the eighth image 708 captured at the third exposure value 713, which are respectively obtained before and after the seventh image 707. In this case, the first composite image 731, the second composite image 732, and the third composite image 733 may be a frame constituting one HDR image. For example, the first composite image 731, the second composite image 732, and the third composite image 733 may be a first frame, a second frame, and a third frame of one HDR image.

The graph illustrated in FIG. 7 illustrates that only a part of a plurality of images continuously captured by a camera module is displayed; in addition to the above-described images, images may be obtained before and after time when the images are captured. Furthermore, an embodiment is exemplified in the graph as the first image 701 corresponding to the first exposure value 711 is captured in a specified order for the first time. However, an embodiment is not limited thereto. The above-described specified order (e.g., an order of the appropriate exposure value, the low-exposure value, the appropriate exposure value, and the high-exposure value) may be only an example; the case where the low-exposure value and the high-exposure value are alternately changed before and after the order of the appropriate exposure value may be possible. For example, the exposure value of the camera module may be changed to the order of the appropriate exposure value, the high-exposure value, the appropriate exposure value, and the low-exposure value, the order of the low-exposure value, the appropriate exposure value, the high-exposure value, and the appropriate exposure value, or the order of the high-exposure value, the appropriate exposure value, the low-exposure value, and the appropriate exposure value.

Figure 8:
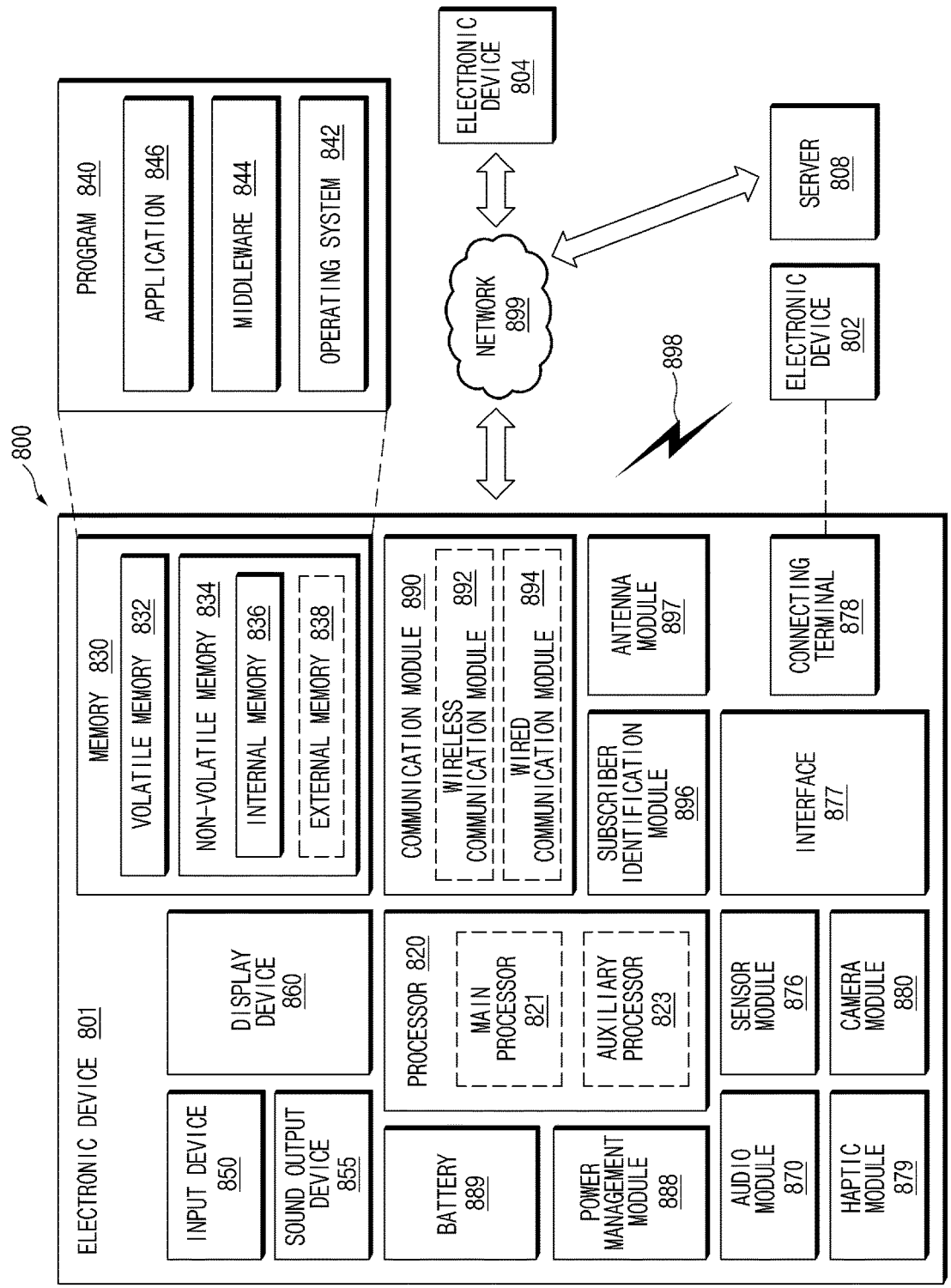
FIG. 8 is a block diagram of an electronic device in a network environment according to an embodiment of the disclosure.

FIG. 8 is a block diagram of an electronic device in a network environment according to an embodiment of the disclosure.

Referring to FIG. 8, an electronic device 801 (e.g., an electronic device 100 of FIG. 1) in a network environment 800 may communicate with an electronic device 802 over a first network 898 (e.g., a short range wireless communication network) or may communicate with an electronic device 804 or a server 808 over a second network 899 (e.g., a long distance wireless communication network). According to an embodiment, the electronic device 801 may communicate with the electronic device 804 through the server 808. According to an embodiment, the electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module 896, or an antenna module 897. In any embodiment, at least one (e.g., the display device 860 or the camera module 880) of the components may be omitted from the electronic device 801, or one or more other components may be further included in the electronic device 801. In any embodiment, some of the components may be implemented with a single integrated circuit. For example, the sensor module 876 (e.g., a fingerprint sensor, an iris sensor, or an illumination sensor) may be embedded in the display device 860 (e.g., a display).

The processor 820 may execute, for example, software (e.g., a program 840) to control at least one other component (e.g., a hardware or software component) of the electronic device 801 connected to the processor 820, and may perform various data processing or operations. According to an embodiment, as at least a part of the data processing or operations, the processor 820 may load a command or data received from any other component (e.g., the sensor module 876 or the communication module 890) to a volatile memory 832, may process the command or data stored in the volatile memory 832, and may store processed data in a nonvolatile memory 834. According to an embodiment, the processor 820 may include a main processor 821 (e.g., a central processing unit or an application processor) and an auxiliary processor 823 (e.g., a graphic processing device, an image signal processor, a sensor hub processor, or a communication processor), which may be operated independently of or together with the main processor 821. Additionally or alternatively, the auxiliary processor 823 may be configured to use lower power than the main processor 821 or to be specialized for a specified function. The auxiliary processor 823 may be implemented separately from the main processor 821 or may be implemented as a part of the main processor 821.

The auxiliary processor 823 may control at least a part of a function or states associated with at least one component (e.g., the display device 860, the sensor module 876, or the communication module 890) of the electronic device 801, for example, instead of the main processor 821 while the main processor 821 is in an inactive (e.g., sleep) state and together with the main processor 821 while the main processor 821 is in an active (e.g., an application execution) state. According to an embodiment, the auxiliary processor 823 (e.g., an image signal processor or a communication processor) may be implemented as a part of any other component (e.g., the camera module 880 or the communication module 890) which is functionally (or operatively) associated with the auxiliary processor 823.

The memory 830 may store various data which are used by at least one component (e.g., the processor 820 or the sensor module 876) of the electronic device 801. The data may include, for example, software (e.g., the program 840), or input data or output data associated with a command of the software. The memory 830 may include the volatile memory 832 or the nonvolatile memory 834. The nonvolatile memory 834 may include internal memory 836 and external memory 838.

The program 840 may be stored in the memory 830 as software, and may include, for example, an operating system 842, a middleware 844, or an application 846.

The input device 850 may receive a commands or data which will be used by a component (e.g., the processor 820) of the electronic device 801, from the outside (e.g., a user) of the electronic device 801. The input device 850 may include, for example, a microphone, a mouse, or a keyboard.

The sound output device 855 may output a sound signal to the outside of the electronic device 801. The sound output device 855 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 860 may visually provide information to the outside (e.g., the user) of the electronic device 801. The display device 860 may include, for example, a display, a hologram device, or a control circuit for controlling a projector and a corresponding device. According to an embodiment, the display device 860 may include a touch circuitry configured to sense a touch, or a sensor circuitry (e.g., a pressure sensor) configured to measure the strength of force generated by the touch.

The audio module 870 may convert sound to an electrical signal, or reversely, may convert an electrical signal to sound. According to an embodiment, the audio module 870 may obtain sound through the input device 850, or may output sound through the sound output device 855, or through an external electronic device (e.g., the electronic device 802) (e.g., a speaker or a headphone) directly or wirelessly connected with the electronic device 801.

The sensor module 876 may sense an operation state (e.g., power or a temperature) of the electronic device 801 or an external environment state (e.g., a user state), and may generate an electrical signal or a data value corresponding the sensed state. According to an embodiment, the sensor module 876 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 877 may support one or more specified protocols that may be used to directly and wirelessly connect the electronic device 801 with an external electronic device (e.g., the electronic device 802). According to an embodiment, the interface 877 may include, for example, a high definition multimedia interface (HDMI), a universal serial bus (USB) interface, a secure digital (SD) card interface, or an audio interface.

A connection terminal 878 may include a connector that may allow the electronic device 801 to be physically connected with an external electronic device (e.g., the electronic device 802). According to an embodiment, the connection terminal 878 may include, for example, a HDMI connector, a USB connector, a SD card connector, or an audio connector (e.g., a headphone connector).

The haptic module 879 may convert an electrical signal to a mechanical stimulation (e.g., vibration or movement) or an electrical stimulation which the user may perceive through the sense of touch or the sense of movement. According to an embodiment, the haptic module 879 may include, for example, a motor, a piezoelectric sensor, or an electrical stimulation device.

The camera module 880 may photograph a still image and a video. According to an embodiment, the camera module 880 may include one or more lenses, image sensors, image signal processors, or flashes (or electrical flashes).

The power management module 888 may manage the power which is supplied to the electronic device 801. According to an embodiment, the power management module 888 may be implemented, for example, as at least a part of a power management integrated circuit (PMIC).

The battery 889 may power at least one component of the electronic device 801. According to an embodiment, the battery 889 may include, for example, a primary cell not recharged, a secondary cell rechargeable, or a fuel cell.

The communication module 890 may establish a direct (or wired) communication channel or a wireless communication channel between the electronic device 801 and an external electronic device (e.g., the electronic device 802, the electronic device 804, or the server 808) or may perform communication through the established communication channel. The communication module 890 may include one or more communication processors which is operated independently of the processor 820 (e.g., an application processor) and supports direct (or wired) communication or wireless communication. According to an embodiment, the communication module 890 may include a wireless communication module 892 (e.g., a cellular communication module, a short range wireless communication module, or a global navigation satellite system (GNSS) communication module) or a wired communication module 894 (e.g., a local area network (LAN) communication module or a power line communication module). A corresponding communication module of such communication modules may communicate with an external electronic device over the first network 898 (e.g., a short range communication network such as Bluetooth, Wi-Fi direct, or infrared data association (IrDA)) or the second network 899 (e.g., a long distance communication network such as a cellular network, an Internet, or a computer network (e.g., LAN or wide area network (WAN)). The above-described kinds of communication modules may be integrated in one component (e.g., a single chip) or may be implemented with a plurality of components (e.g., a plurality of chips) which are independent of each other. The wireless communication module 892 may verify and authenticate the electronic device 801 within a communication network, such as the first network 898 or the second network 899, by using subscriber information (e.g., international mobile subscriber identity (IMSI)) stored in the subscriber identification module 896.

The antenna module 897 may transmit a signal or a power to the outside (e.g., an external electronic device) or may receive a signal or a power from the outside. According to an embodiment, the antenna module 897 may include one or more antennas, and at least one antenna which is suitable for a communication scheme used in a computer network such as the first network 898 or the second network 899 may be selected, for example, by the communication module 890 from the one or more antennas. The signal or power may be exchanged between the communication module 890 and an external electronic device through the selected at least one antenna or may be received from the external electronic device through the selected at least one antenna and the communication module 890.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 801 and the external electronic device 804 through the server 808 connecting to the second network 899. Each of the electronic devices 802 and 804 may be a device, the kind of which is the same as or different from a kind of the electronic device 801. According to an embodiment, all or a part of operations to be executed in the electronic device 801 may be executed in one or more external devices of the external electronic devices 802, 804, or 808. For example, in the case where the electronic device 801 should perform any function or service automatically or in response to a request from the user or any other device, the electronic device 801 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 801. The electronic device 801 may process received result as it is or additionally, and may provide a result of the processing as at least a part of the response to the request. To this end, for example, a cloud computing, distributed computing, or client-server computing technology may be used.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a memory;
a camera module; and
a processor electrically connected to the memory and the camera module,
wherein the processor is configured to:
determine a first exposure value based on a brightness of an external object,
sequentially capture first to fifth images, wherein the second image and the fourth image have the determined first exposure value, the first image and the fifth image have a second exposure value that is less than the first exposure value, and the third image has a third exposure value that is greater than the first exposure value, and
when a condition is satisfied,
generate a first composite image using the first to third images, and a second composite image using the third to fifth images.

2. The electronic device of claim 1,
wherein the camera module comprises an image sensor, and
wherein the processor is further configured to determine the brightness of the external object using the image sensor.

3. The electronic device of claim 1, further comprising:
an illumination sensor,
wherein the processor is further configured to measure the brightness of the external object using the illumination sensor.

4. The electronic device of claim 1, wherein the processor is further configured to, when an input corresponding to capture completion is received or a time period expires, determine that the condition is satisfied.

5. The electronic device of claim 1, wherein the processor is further configured to store at least one of the first to fifth images, the first composite image or the second composite image in the memory.

6. The electronic device of claim 1, further comprising:
a display,
wherein the processor is further configured to output the first composite image or the second composite image on the display.

7. The electronic device of claim 1, further comprising:
a communication circuit configured to communicate with an external electronic device,
wherein the processor is further configured to control the communication circuit to transmit the first to fifth images to the external electronic device, and
wherein the external electronic device is configured to:
when a condition is satisfied, generate a third composite image using the first to third images, and
generate a fourth composite image using the third to fifth images.

8. The electronic device of claim 7, wherein the processor is further configured to, when an input associated with image transmission to the external electronic device is received, determine that the condition is satisfied.

9. The electronic device of claim 7, further comprising:
a display,
wherein the processor is further configured to:
receive the third composite image and fourth composite image from the external electronic device using the communication circuit, and
output the third composite image or the fourth composite image on the display.

10. The electronic device of claim 9, wherein the processor is further configured to store the third composite image and the fourth composite image in the memory.

11. An electronic device comprising:
a memory;
a camera module;
a communication circuit configured to communicate with an external electronic device; and
a processor electrically connected to the memory, the camera module, and the communication circuit,
wherein the processor is configured to:
determine a first exposure value based on a brightness of an external object,
sequentially capture first to fifth images, wherein the second image and the fourth image have the determined first exposure value, the first image and the fifth image have a second exposure value that is less than the first exposure value, and the third image has a third exposure value that is greater than the first exposure value, and
when a condition is satisfied,
transmit the first to fifth images to the external electronic device through the communication circuit, and
wherein the external electronic device is configured to;
generate a first composite image using the first to third images, and
generate a second composite image using the third to fifth images.

12. The electronic device of claim 11,
wherein the camera module comprises an image sensor, and
wherein the processor is further configured to determine the brightness of the external object using the image sensor.

13. The electronic device of claim 11, further comprising:
an illumination sensor,
wherein the processor is further configured to measure the brightness using the illumination sensor.

14. The electronic device of claim 11, wherein the processor is further configured to, when an input corresponding to capture completion is received, a time period expires, or an input associated with image transmission to the external electronic device is received, determine that the condition is satisfied.

15. The electronic device of claim 11, further comprising:
a display,
wherein the processor is further configured to:
receive the first composite image and the second composite image from the external electronic device through the communication circuit, and
output the first composite image or the second composite image on the display.

16. The electronic device of claim 11, wherein the processor is further configured to store the first composite image and the second composite image in the memory.

17. An image processing method performed in an electronic device, the method comprising:
determining a first exposure value based on a brightness of an object outside the electronic device;
sequentially capturing first to fifth images, wherein the second image and the fourth image have the determined first exposure value, the first image and the fifth image have a second exposure value that is less than the first exposure value, and the third image has a third exposure value that is greater than the first exposure value; and
when a condition is satisfied,
generating a first composite image using the first to third image, and a second composite image using the third to fifth images.

18. The method of claim 17, wherein the determining the first exposure value includes determining the first exposure value using an image sensor included in a camera module of the electronic device.

19. The method of claim 17, wherein the determining the first exposure value includes determining the first exposure value using an illumination sensor of the electronic device.

* * * * *